US012590906B2

(12) United States Patent
Yoshida et al.

(10) Patent No.: US 12,590,906 B2
(45) Date of Patent: Mar. 31, 2026

(54) X-RAY INSPECTION APPARATUS, X-RAY INSPECTION SYSTEM, AND X-RAY INSPECTION METHOD

(71) Applicant: ISHIDA CO., LTD., Kyoto (JP)

(72) Inventors: Keisuke Yoshida, Ritto (JP); Futoshi Yurugi, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 449 days.

(21) Appl. No.: 18/072,471

(22) Filed: Nov. 30, 2022

(65) Prior Publication Data

US 2023/0175984 A1     Jun. 8, 2023

(30) Foreign Application Priority Data

Dec. 2, 2021     (JP) ................................. 2021-195926

(51) Int. Cl.
*G01N 23/04*         (2018.01)
*G01N 23/083*        (2018.01)
                    (Continued)

(52) U.S. Cl.
CPC .......... *G01N 23/04* (2013.01); *G01N 23/083* (2013.01); *G06T 5/40* (2013.01); *G06T 5/50* (2013.01);
                    (Continued)

(58) Field of Classification Search
CPC .. G01N 23/04; G01N 23/083; G01N 2223/04; G01N 2223/401; G01N 2223/50;
                    (Continued)

(56) References Cited

U.S. PATENT DOCUMENTS

| | | | |
|---|---|---|---|
| 2015/0192690 A1 | 7/2015 | Bridger et al. | |
| 2017/0227477 A1* | 8/2017 | Sugimoto | .............. G01N 23/18 |
| 2020/0302590 A1* | 9/2020 | Sugimoto | ............. G06T 7/0002 |

FOREIGN PATENT DOCUMENTS

| | | |
|---|---|---|
| CN | 104135929 A | 11/2014 |
| CN | 106574903 A | 4/2017 |

(Continued)

OTHER PUBLICATIONS

JP2020176893 Sugimoto et al (Year: 2020).*
Extended Search Report in the corresponding European Patent Application No. 22210454.9 dated Mar. 28, 2023.

*Primary Examiner* — Jianxun Yang
(74) *Attorney, Agent, or Firm* — Spencer Fane LLP

(57) ABSTRACT

An X-ray inspection apparatus includes a transport unit configured to transport an article, an electromagnetic wave irradiation unit configured to irradiate the article with a first electromagnetic wave in a first energy band and a second electromagnetic wave in a second energy band, an electromagnetic wave sensor configured to detect the first electromagnetic wave and the second electromagnetic wave, and a control unit to which a detection result is input. The control unit is configured to generate a first transmission image based on a detection result of the first electromagnetic wave and a second transmission image based on a detection result of the second electromagnetic wave, to perform image processing including a subtraction process on the first transmission image and the second transmission image, and to determine whether or not a foreign material is included in the article on the basis of a difference image.

19 Claims, 12 Drawing Sheets

(51) Int. Cl.

| | | |
|---|---|---|
| *G06T 5/40* | (2006.01) | |
| *G06T 5/50* | (2006.01) | |
| *G06T 7/00* | (2017.01) | |

(52) U.S. Cl.
CPC ........ *G06T 7/0002* (2013.01); *G01N 2223/04* (2013.01); *G01N 2223/401* (2013.01); *G01N 2223/50* (2013.01); *G01N 2223/643* (2013.01); *G06T 2207/10116* (2013.01); *G06T 2207/20224* (2013.01)

(58) Field of Classification Search
CPC ....... G01N 2223/643; G01N 2223/424; G01N 23/087; G01N 23/18; G01N 2223/1016; G01N 2223/3307; G01N 2223/652; G06T 5/40; G06T 5/50; G06T 7/0002; G06T 2207/10116; G06T 2207/20224
See application file for complete search history.

(56) References Cited

FOREIGN PATENT DOCUMENTS

| | | | |
|---|---|---|---|
| JP | H10-104175 | A | 4/1998 |
| JP | 2003-168103 | A | 6/2003 |
| JP | 2006-071423 | A | 3/2006 |
| JP | 2012-073056 | A | 4/2012 |
| JP | 2013-101042 | A | 5/2013 |
| JP | 2017-072554 | A | 4/2017 |
| JP | 2018-141736 | A | 9/2018 |
| JP | 2020-153777 | A | 9/2020 |
| JP | 2020-176893 | A | 10/2020 |

* cited by examiner

GRADATION
(SECOND TRANSMISSION IMAGE P2)

GRADATION
(FIRST TRANSMISSION IMAGE P1)

P103

X-RAY INSPECTION APPARATUS, X-RAY INSPECTION SYSTEM, AND X-RAY INSPECTION METHOD

TECHNICAL FIELD

The present disclosure relates to an X-ray inspection apparatus, an X-ray inspection system, and an X-ray inspection method.

BACKGROUND

For example, an apparatus described in Japanese Unexamined Patent Publication No. 2012-73056 is known as an X-ray inspection apparatus according to the related art. The X-ray inspection apparatus described in Japanese Unexamined Patent Publication No. 2012-73056 includes an X-ray source that irradiates an object to be inspected with X-rays, a sensor unit including a first sensor that detects X-rays in a first energy band and a second sensor that detects X-rays in a second energy band emitted from the X-ray source, an image generation unit that generates a first transmission image of the object to be inspected on the basis of X-ray data detected by the first sensor and a second transmission image of the object to be inspected on the basis of X-ray data detected by the second sensor, and an inspection unit that performs inspection on the basis of the images generated by the image generation unit.

SUMMARY

In the above-described X-ray inspection apparatus, for example, as a transport speed of an article becomes higher, an X-ray irradiation time for the article becomes shorter. Therefore, the inspection accuracy of the object to be inspected is reduced.

An object of an aspect of the present disclosure is to provide an X-ray inspection apparatus, an X-ray inspection system, and an X-ray inspection method that can prevent a reduction in the inspection accuracy of an article even when a transport speed of the article is increased.

According to an aspect of the present disclosure, there is provided an X-ray inspection apparatus including: a transport unit configured to transport an article; an electromagnetic wave irradiation unit configured to irradiate the article with a first electromagnetic wave in a first energy band and a second electromagnetic wave in a second energy band higher than the first energy band; an electromagnetic wave sensor configured to detect the first electromagnetic wave and the second electromagnetic wave emitted to the article; and a control unit to which a detection result of the electromagnetic wave sensor is input. The control unit is configured to generate a first transmission image based on a detection result of the first electromagnetic wave and a second transmission image based on a detection result of the second electromagnetic wave, to perform image processing including a subtraction process on the first transmission image and the second transmission image by directly or indirectly using a luminance distribution related to a background other than the article displayed in the first transmission image and the second transmission image, and to determine whether or not a foreign material is included in the article on the basis of a difference image obtained by the subtraction process.

According to this X-ray inspection apparatus, the control unit performs the image processing including the subtraction process on the first transmission image and the second transmission image by directly or indirectly using the luminance distribution related to the background other than the article displayed in the first transmission image and the second transmission image. The use of the difference image obtained by performing the image processing using the luminance distribution in this way makes it possible to perform a high-accuracy energy analysis process. Therefore, for example, it is possible to prevent a reduction in the inspection accuracy of the article even when the transport speed of the article by the transport unit is increased.

The image processing may further include a look-up table (LUT) generation process of generating an LUT used to match a brightness of the first transmission image with a brightness of the second transmission image, on the basis of first data indicating the number of pixels for each gradation in the first transmission image and second data indicating the number of pixels for each gradation in the second transmission image, an LUT correction process of correcting at least a portion of the LUT, directly or indirectly using the luminance distribution, and an image correction process of correcting the brightness of the first transmission image using the corrected LUT. The subtraction process may be performed on the first transmission image after the image correction process and the second transmission image. In this case, the first transmission image is corrected with the LUT corrected using the luminance distribution. It is easy to generate an appropriate difference image.

The control unit may be configured to specify a first gradation corresponding to a largest number of pixels from the luminance distribution, and a second gradation which is lower than the first gradation and is closest to the first gradation among gradations corresponding to a smallest number of pixels from the luminance distribution, and to correct at least a part of the LUT from the first gradation to the second gradation. In this case, it is easy to generate a more appropriate difference image.

The control unit may be configured to correct between the first gradation and the second gradation in the LUT so as to increase proportionally. In this case, it is possible to easily and satisfactorily correct the LUT.

In the LUT correction process, at least a part of the LUT may be corrected using an LUT for correction which is generated on the basis of the luminance distribution.

The electromagnetic wave sensor nay include a sensor member configured to detect X-rays in a plurality of different energy bands.

According to another aspect of the present disclosure, there is provided an X-ray inspection system including: an X-ray inspection apparatus including a transport unit configured to transport an article, an electromagnetic wave irradiation unit configured to irradiate the article with a first electromagnetic wave in a first energy band and a second electromagnetic wave in a second energy band higher than the first energy band, and an electromagnetic wave sensor configured to detect the first electromagnetic wave and the second electromagnetic wave emitted to the article; and a controller to which a detection result of the X-ray inspection apparatus is input. The controller is configured to generate a first transmission image based on a detection result of the first electromagnetic wave and a second transmission image based on a detection result of the second electromagnetic wave, and perform image processing including a subtraction process on the first transmission image and the second transmission image by using a luminance distribution related to a background other than the article displayed in the first transmission image and the second transmission image.

According to this X-ray inspection system, the controller performs the image processing including the subtraction process on the first transmission image and the second transmission image by using the luminance distribution related to the background other than the article displayed in the first transmission image and the second transmission image. The image processing using the luminance distribution is performed in this way to obtain a difference image. Then, the use of the difference image makes it possible to perform a high-accuracy energy analysis process. Therefore, for example, it is possible to prevent a reduction in the inspection accuracy of the article even when the transport speed of the article by the transport unit is increased.

According to still another aspect of the present disclosure, there may be provided an X-ray inspection method including: an electromagnetic wave irradiation step of irradiating an article which is being transported, with a first electromagnetic wave in a first energy band and a second electromagnetic wave in a second energy band higher than the first energy band; an image generation step of generating a first transmission image based on a detection result of the first electromagnetic wave and generating a second transmission image based on a detection result of the second electromagnetic wave; an image processing step of performing image processing including a subtraction process on the first transmission image and the second transmission image by using a luminance distribution related to a background other than the article displayed in the first transmission image and the second transmission image; and a foreign material determination step of determining whether or not a foreign material is included in the article on the basis of a difference image obtained after the image processing step.

According to this X-ray inspection method, the image processing including the subtraction process is performed on the first transmission image and the second transmission image by using the luminance distribution related to the background other than the article displayed in the first transmission image and the second transmission image. The use of a difference image obtained by performing the image processing using the luminance distribution in this way makes it possible to perform a high-accuracy energy analysis process. Therefore, for example, it is possible to prevent a reduction in the inspection accuracy of the article even when the transport speed of the article by the transport unit is increased.

DETAILED DESCRIPTION

Figure 1:
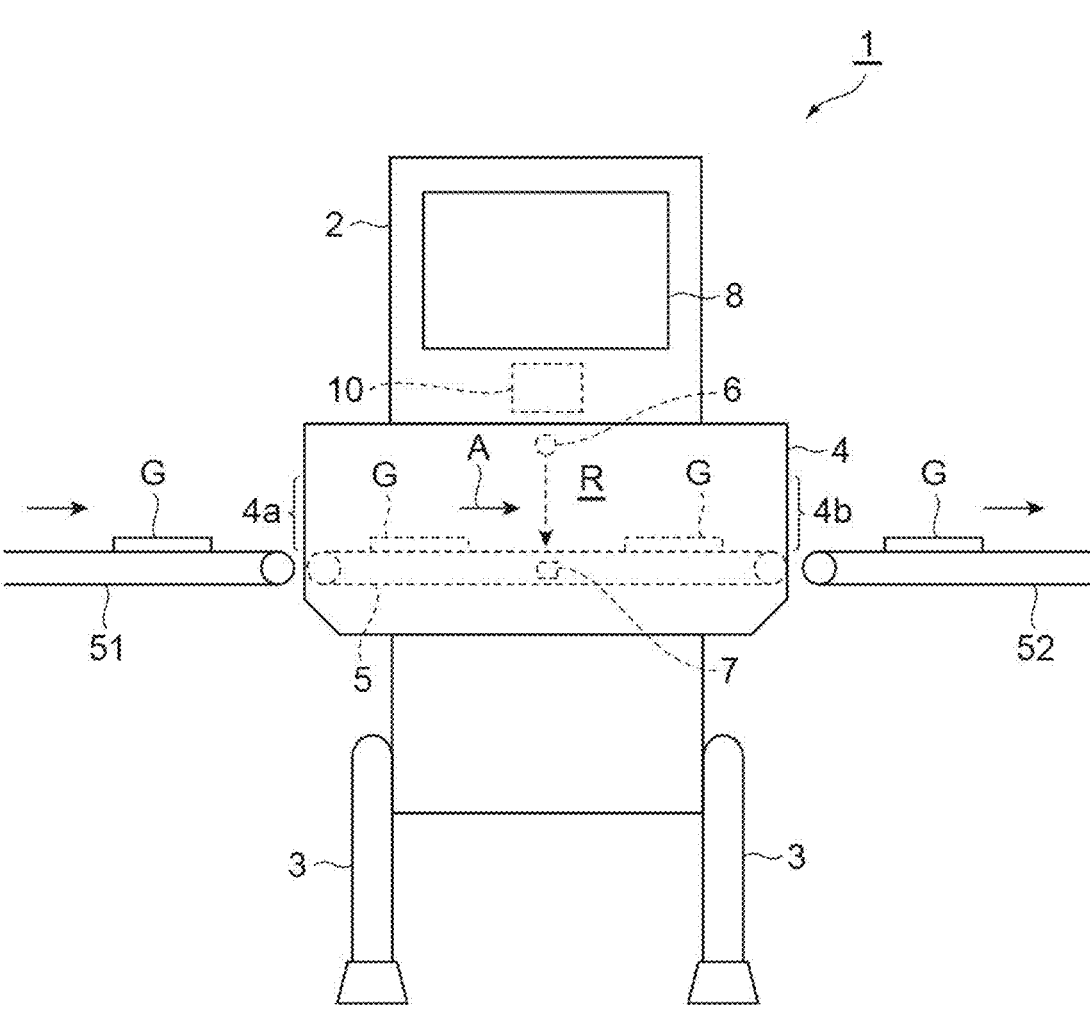
FIG. 1 is a diagram showing a configuration of an X-ray inspection apparatus according to an embodiment.

Hereinafter, preferred embodiments of the present disclosure will be described in detail below with reference to the accompanying drawings. In the description of the drawings, the same or corresponding elements are denoted by the same reference numerals, and the redundant description thereof will be omitted.

As shown in FIG. 1, an X-ray inspection apparatus 1 includes an apparatus main body 2, support legs 3, a shield box 4, a transport unit 5, an X-ray irradiation unit 6, an X-ray detection unit 7, a display operation unit 8, and a control unit 10. The X-ray inspection apparatus 1 generates an X-ray transmission image of an article G while transporting the article G and inspects the article G on the basis of the X-ray transmission image. The article G before inspection is carried into the X-ray inspection apparatus 1 by a carry-in conveyor 51. The article G after inspection is carried out from the X-ray inspection apparatus 1 by a carry-out conveyor 52. In this embodiment, the article G is a cereal flake.

The apparatus main body 2 accommodates the control unit 10 and the like. The support legs 3 support the apparatus main body 2. The shield box 4 is provided in the apparatus main body 2. The shield box 4 prevents the leakage of X-rays (electromagnetic waves) to the outside. An inspection region R in which the article G is inspected by X-rays is provided in the shield box 4. A carry-in port 4a and a carry-out port 4b are formed in the shield box 4.

The transport unit 5 transports the article G along a transport direction A from the carry-in port 4a to the carry-out port 4b through the inspection region R.

Figure 2:
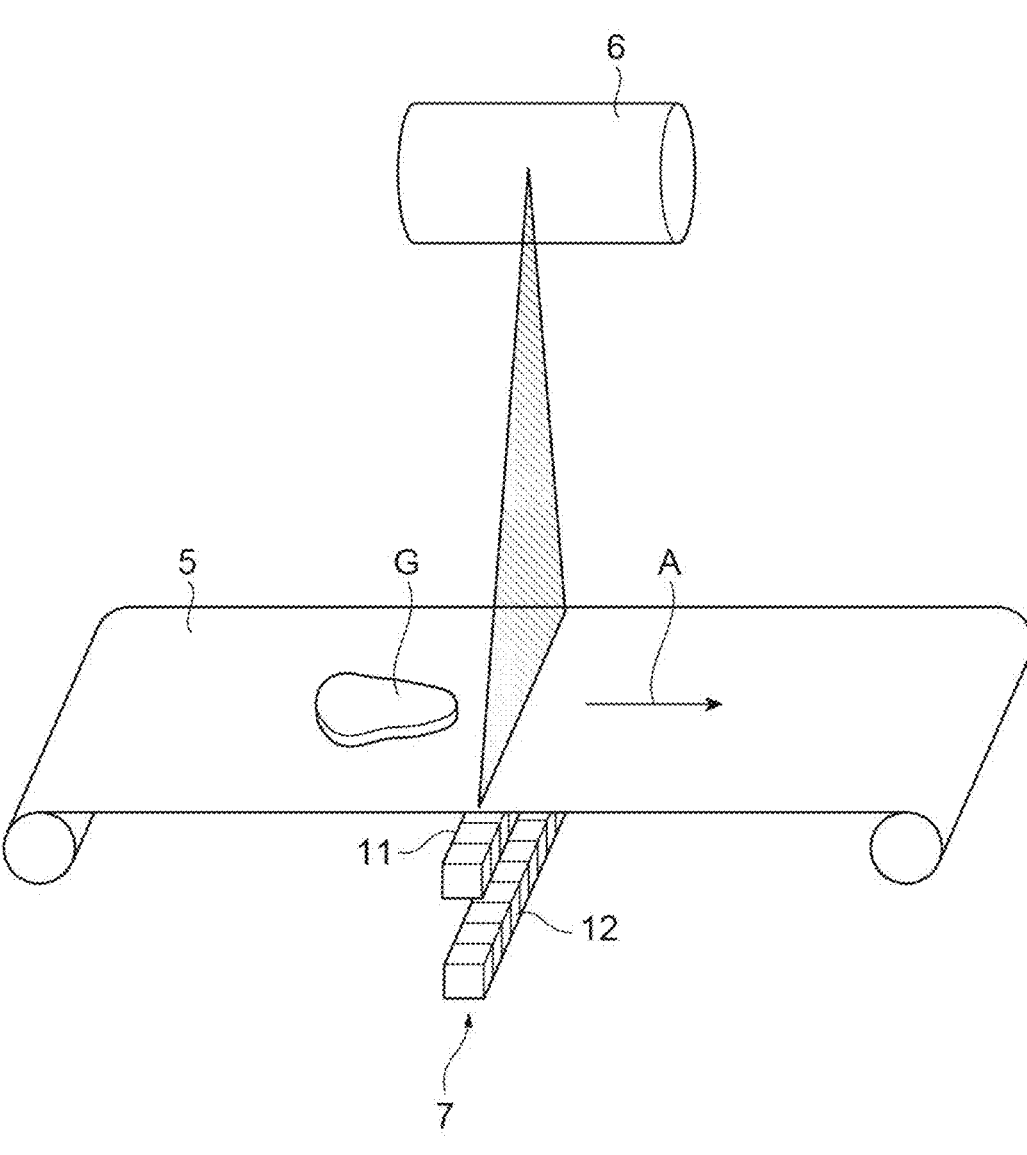
FIG. 2 is a diagram showing an internal configuration of a shield box shown in FIG. 1.

As shown in FIGS. 1 and 2, the X-ray irradiation unit 6 is an electromagnetic wave irradiation unit that is disposed in the shield box 4. The X-ray irradiation unit 6 irradiates the article G transported by the transport unit 5 with X-rays. The X-rays emitted from the X-ray irradiation unit 6 include X-rays in various energy bands from low energy (long wavelength) to high energy (short wavelength). In addition, "low" and "high" in the low energy band and the high energy band described above indicate relatively "low" and "high" among a plurality of energy bands of X-rays emitted from the X-ray irradiation unit 6 and do not indicate a specific range. In this embodiment, the X-ray irradiation unit 6 emits at least X-rays (first electromagnetic waves) in a first energy band which corresponds to the low energy band and X-rays (second electromagnetic waves) in a second energy band which is higher than the first energy band and corresponds to the high energy band.

The X-ray detection unit 7 is a sensor member (electromagnetic wave sensor) detecting electromagnetic waves and is disposed in the shield box 4. In this embodiment, the X-ray detection unit 7 is configured to detect X-rays in the low energy band and X-rays in the high energy band. That is, the X-ray detection unit 7 has a first line sensor 11 and a second line sensor 12.

Each of the first line sensor 11 and the second line sensor 12 is composed of a plurality of X-ray detection elements which are arranged one-dimensionally along a horizontal direction perpendicular to the transport direction A. The first line sensor 11 detects the X-rays in the low energy band which have been transmitted through the article G and the conveyor belt of the transport unit 5. The second line sensor 12 detects the X-rays in the high energy band which have been transmitted through the conveyor belt of the transport unit 5 and the first line sensor 11.

As shown in FIG. 1, the display operation unit 8 is provided in the apparatus main body 2. The display operation unit 8 displays various types of information and receives the input of various conditions.

The control unit 10 is disposed in the apparatus main body 2. The control unit 10 controls the operation of each unit (in this embodiment, the transport unit 5, the X-ray irradiation unit 6, the X-ray detection unit 7, the display operation unit 8, and a sorting device (not shown) disposed on a downstream side of the X-ray inspection apparatus 1) of the X-ray inspection apparatus 1.

Figure 3A:
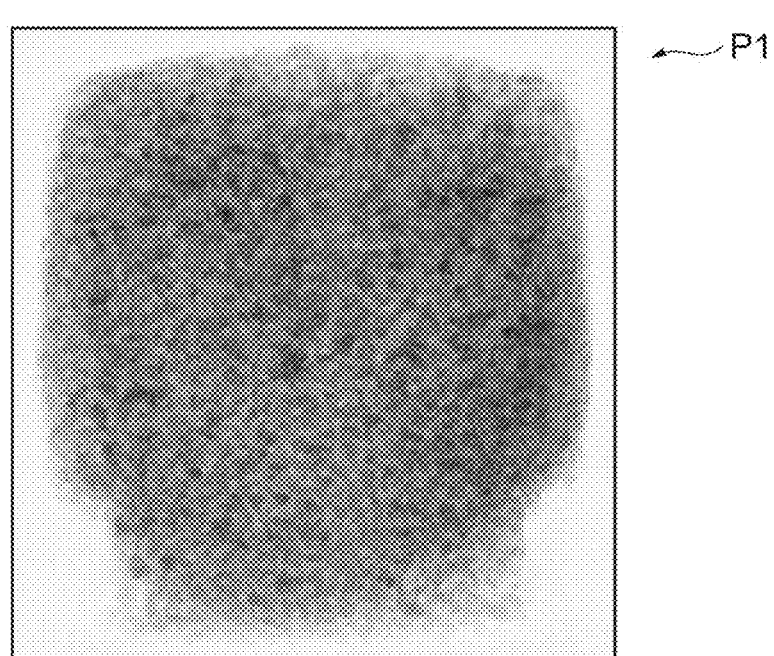
FIG. 3A is a diagram showing a first transmission image.
Figure 3B:
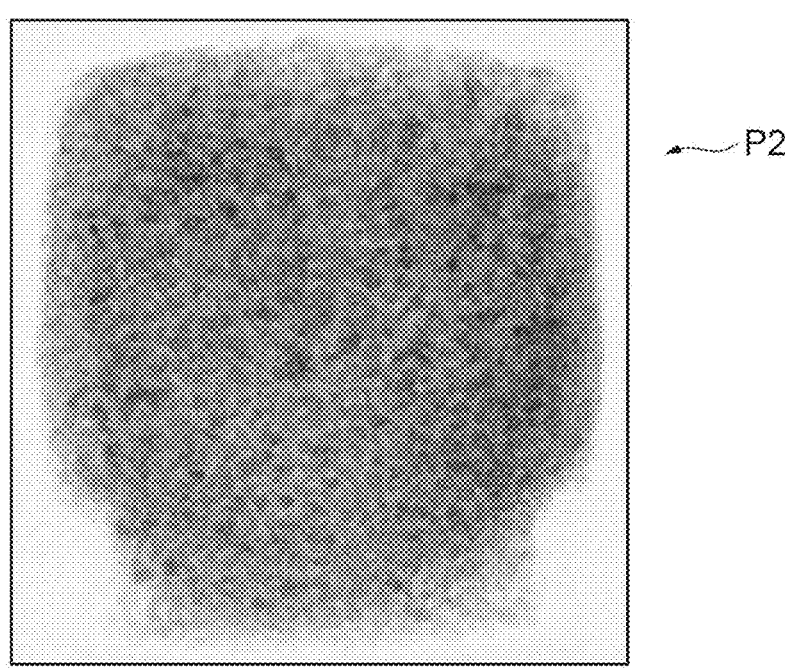
FIG. 3B is a diagram showing a second transmission image.

A detection result of the X-ray detection unit 7 is input to the control unit 10. In this embodiment, the detection result of the X-rays in the low energy band is input from the first line sensor 11 of the X-ray detection unit 7 to the control unit 10, and the detection result of the X-rays in the high energy band is input from the second line sensor 12 of the X-ray detection unit 7 to the control unit 10. The control unit 10 generates transmission images on the basis of the detection results of the first line sensor 11 and the second line sensor 12. As shown in FIG. 3A, the control unit 10 generates a first transmission image P1 on the basis of the detection result of the X-rays in the low energy band by the first line sensor 11. As shown in FIG. 3B, the control unit 10 generates a second transmission image P2 on the basis of the detection result of the X-rays in the high energy band by the second line sensor 12. The article G and a background other than the article G are displayed in each of the first transmission image P1 and the second transmission image P2. As in the example shown in FIG. 3A, the first transmission image P1 is overall darker than the second transmission image P2. On the other hand, as in the example shown in FIG. 3B, the second transmission image P2 is overall brighter than the first transmission image P1 In this embodiment, the comparison between the brightness of the first transmission image P1 and the brightness of the second transmission image P2 corresponds to the comparison between the brightness of the article G displayed in the first transmission image P and the brightness of the article G displayed in the second transmission image P2.

The control unit 10 performs image processing including a subtraction process on the first transmission image P1 and the second transmission image P2 by using a luminance distribution of the background other than the article G displayed in the first transmission image P1 and the second transmission image P2. In this example, the luminance distribution related to the background other than the article G displayed in the first transmission image P1 and the second transmission image P2 can also be regarded as a luminance distribution of a background image which will be described below. In this embodiment, the control unit 10 performs the image processing on at least one of the first transmission image P1 and the second transmission image P2 by using an image processing algorithm. The image processing algorithm is a type indicating a processing procedure of the image processing performed on the first transmission image P1 and the second transmission image P2. The image processing algorithm is configured by one image processing filter or a combination of a plurality of image processing filters.

Figure 4:
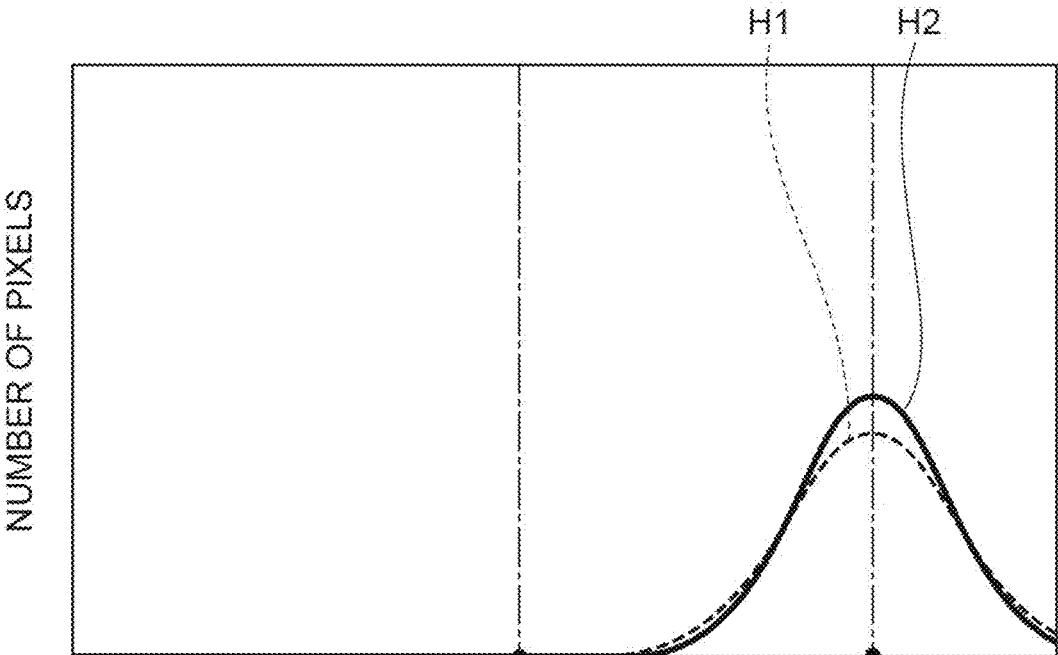
FIG. 4 is a histogram showing the number of pixels for gradation in a background image.

Hereinafter, an example of the image processing performed by the control unit 10 will be described. The control unit 10 performs a process of analyzing the luminance distribution of the background image. The background image is a transmission image that is generated during an idle operation of the X-ray inspection apparatus 1 and can be generated, for example, at the time of the pre-inspection process of the X-ray inspection apparatus 1. No articles are disposed in the shield box 4 during the idle operation of the X-ray inspection apparatus 1. Therefore, a surface of the transport unit 5 corresponding to the background in the first transmission image P1 and the second transmission image P2 is displayed in the entire surface of the background image. In this embodiment, the background image is generated on the basis of the detection results of the first line sensor 11 and the second line sensor 12 during the idle operation of the X-ray inspection apparatus 1. The control unit 10 determines the gradation (luminance value) of each pixel in the background image in order to analyze the luminance distribution of the background image. In addition, the control unit 10 calculates the number of pixels for each gradation. In this embodiment, the gradation of each pixel in the image generated by the X-ray inspection apparatus 1 is set to any value between 0 and a (a is a natural number). Therefore, the control unit 10 obtains information related to the luminance distribution of the background image, that is, the number of pixels for each gradation in the background image. The control unit 10 generates, for example, a histogram shown in FIG. 4. FIG. 4 is a histogram showing the number of pixels for gradation in the background image. In FIG. 4, the horizontal axis indicates the gradation, and the vertical axis indicates the number of pixels. FIG. 4 shows that the gradation increases toward the right side of paper and the number of pixels increases toward the upper side of the paper (this holds for FIGS. 5A, 5B, 6A, 6B, 12A, and 12B which will be described below). FIG. 4 shows a histogram H1 that is generated on the basis of the detection result of the first line sensor 11 and a histogram H2 that is generated on the basis of the detection result of the second line sensor 12. It can be understood that a peak in each of the histograms H1 and H2 is caused by the background (transport unit 5).

Then, the control unit 10 acquires noise information from the luminance distribution. The noise information is information for specifying a range in which a look-up table (LUT) which will be generated below is corrected. The noise information includes a gradation (first gradation T1) corresponding to the largest number of pixels, and a gradation (second gradation T2) which is lower than the first gradation T1 and is closest to the first gradation T1 among the gradations corresponding to the smallest number of pixels in the luminance distribution. The second gradation T2 may be a gradation which is lower than the first gradation T1 and has the largest value, among the gradations corresponding to the smallest number of pixels. The first gradation T1 and the second gradation T2 are specified by using at least one of the histograms H1 and H2. The specified first gradation T1 and second gradation T2 are stored in the storage unit in association with, for example, the transport speed of the transport unit 5 and the detection level of the X-ray detection unit 7. Therefore, for example, at least one of the first gradation T1 and the second gradation T2 can differ for each transport speed of the transport unit 5. This makes it possible to perform an image correction process suitable for the transport speed and the like. In addition, at least one of the first gradation T1 and the second gradation T2 may be updated, for example, when the X-ray inspection apparatus 1 is restarted.

Figure 5A:
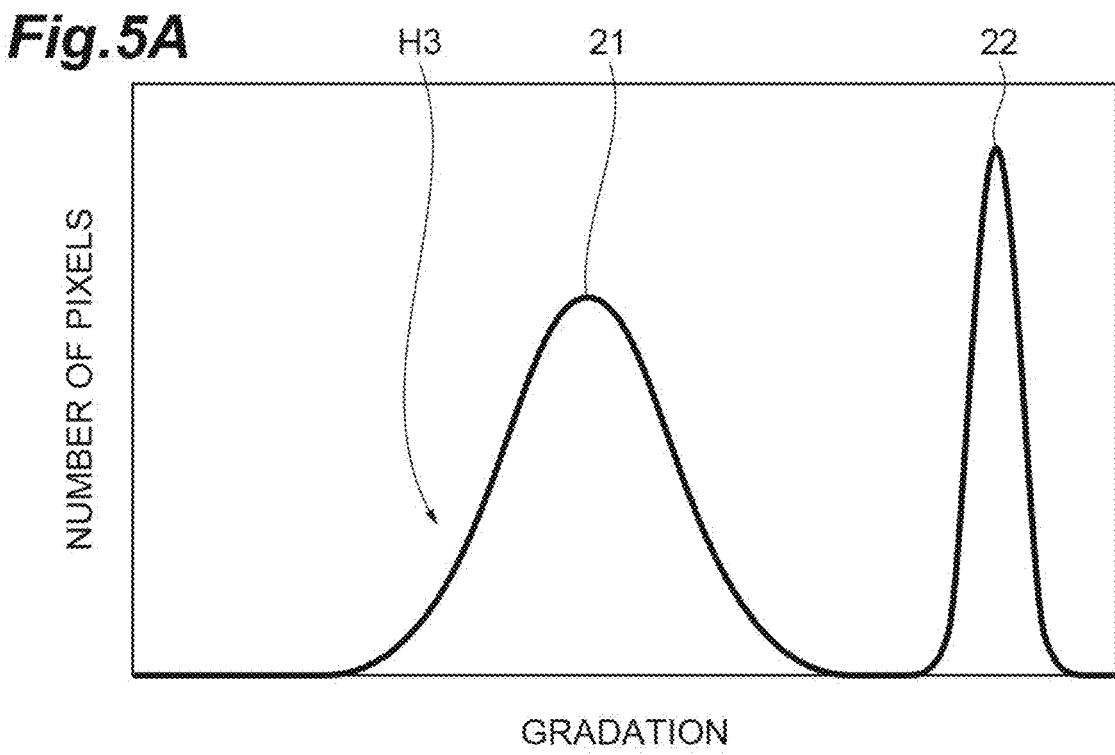
FIG. 5A is a histogram showing the number of pixels fir gradation in the first transmission image.
Figure 5B:
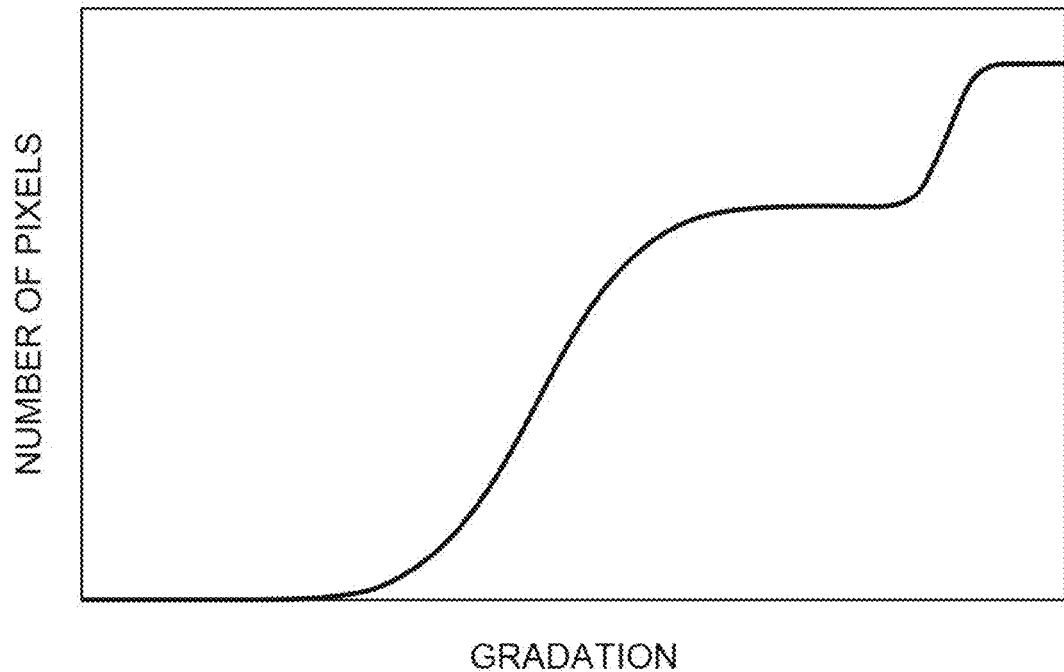
FIG. 5B is a histogram showing the integrated number of pixels for gradation in the first transmission image.

The control unit 10 analyzes shading information of the first transmission image P1. For example, the control unit 10 determines the gradation of each pixel in the first transmission image P1 and calculates the number of pixels having the same gradation. Then, the control unit 10 generates data (first data) indicating the number of pixels for each gradation in the first transmission image P1. The control unit 10 generates two types of histograms shown in FIGS. 5A and 5B on the basis of the first data. FIG. 5A is a histogram showing the number of pixels for gradation in the first transmission image P1, and FIG. 5B is a histogram showing the integrated number of pixels for gradation in the first transmission image P1. In FIGS. 5A and 5B, the horizontal axis indicates the gradation, and the vertical axis indicates the number of pixels. A histogram H3 shown in FIG. 5A includes a peak 21 and a peak 22 that is located on the higher gradation side than the peak 21. It can be understood that the peak 21 is caused by the article G and the peak 22 is caused by the background on the basis of the histograms H1 and H2 shown in FIG. 4.

Figure 6A:
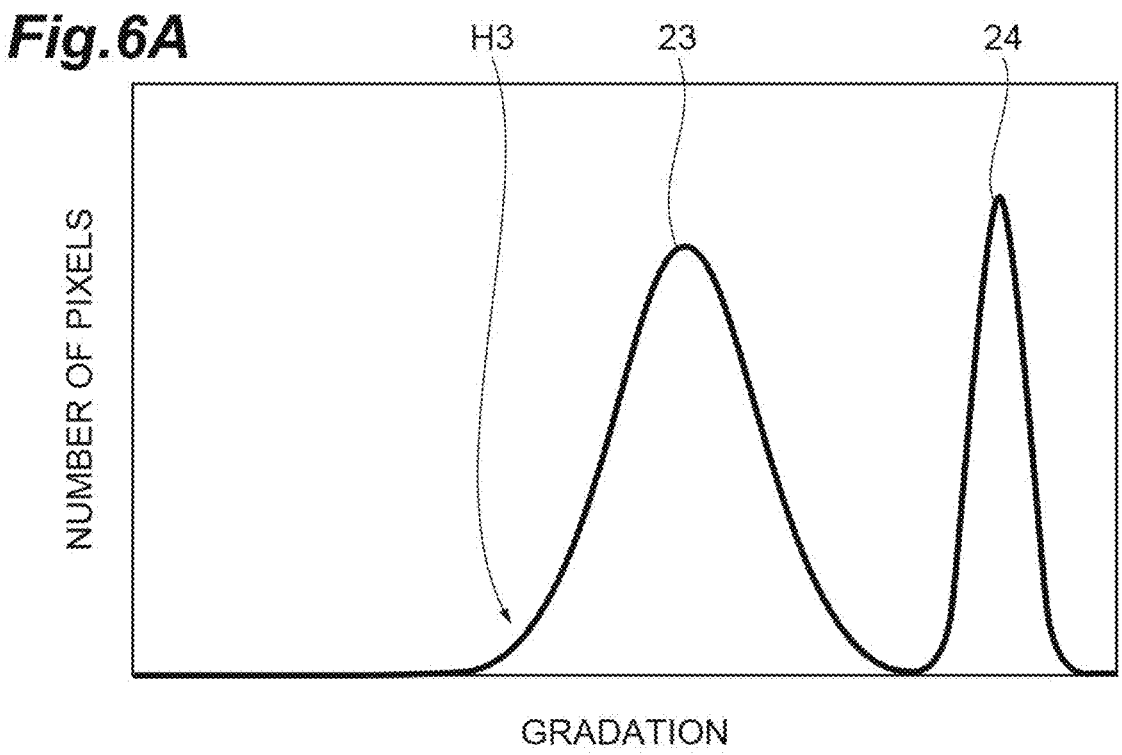
FIG. 6A is a histogram showing the number of pixels for gradation in the second transmission image.
Figure 6B:
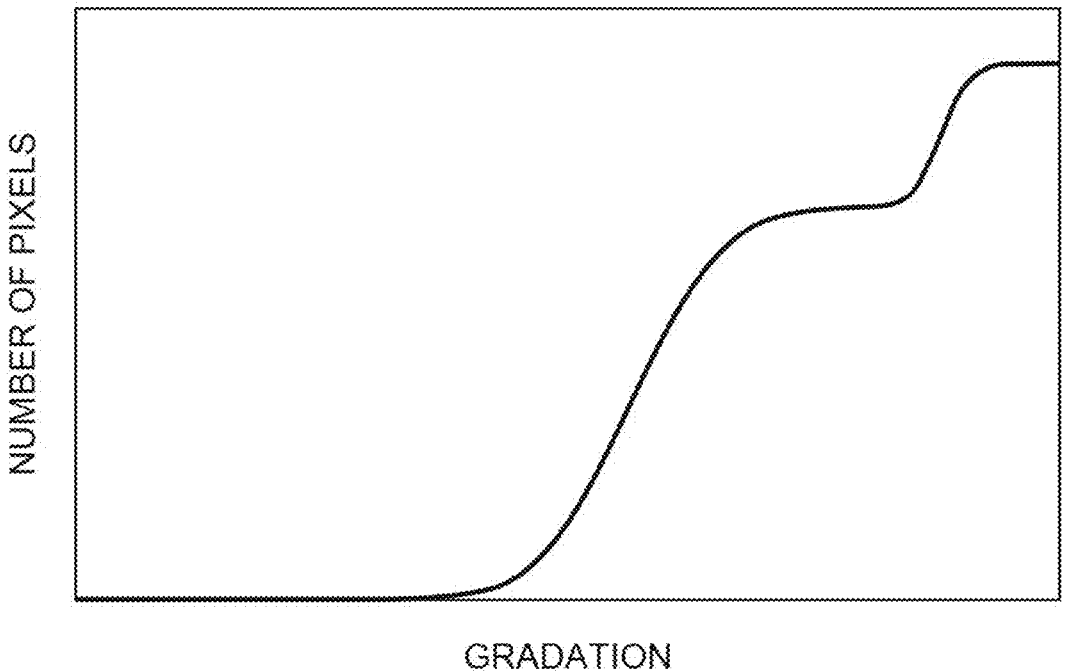
FIG. 6B is a histogram showing the integrated number of pixels for gradation in the second transmission image.

The control unit 10 analyzes the shading information of the second transmission image P2. For example, the control unit 10 determines the gradation of each pixel in the second transmission image P2 and calculates the number of pixels having the same gradation. Then, the control unit 10 generates data (second data) indicating the number of pixels for each gradation in the second transmission image P2. The control unit 10 generates two types of histograms shown in FIGS. 6A and 6B on the basis of the second data. FIG. 6A is a histogram showing the number of pixels for gradation in the second transmission image P2, and FIG. 6B is a histogram showing the integrated number of pixels for gradation in the second transmission image P2. In FIGS. 6A and 6B, the horizontal axis indicates the gradation, and the vertical axis indicates the number of pixels. A histogram H4 shown in FIG. 6A includes a peak 23 and a peak 24 that is located on the higher gradation side than the peak 23. It can be understood that the peak 23 is caused by the article G and the peak 24 is caused by the background, on the basis of the histograms H1 and H2 shown in FIG. 4. The positions of the peaks 21 and 23 deviate from each other. This deviation occurs since the brightness of the first transmission image P1 is different from the brightness of the second transmission image P2.

Figure 7:
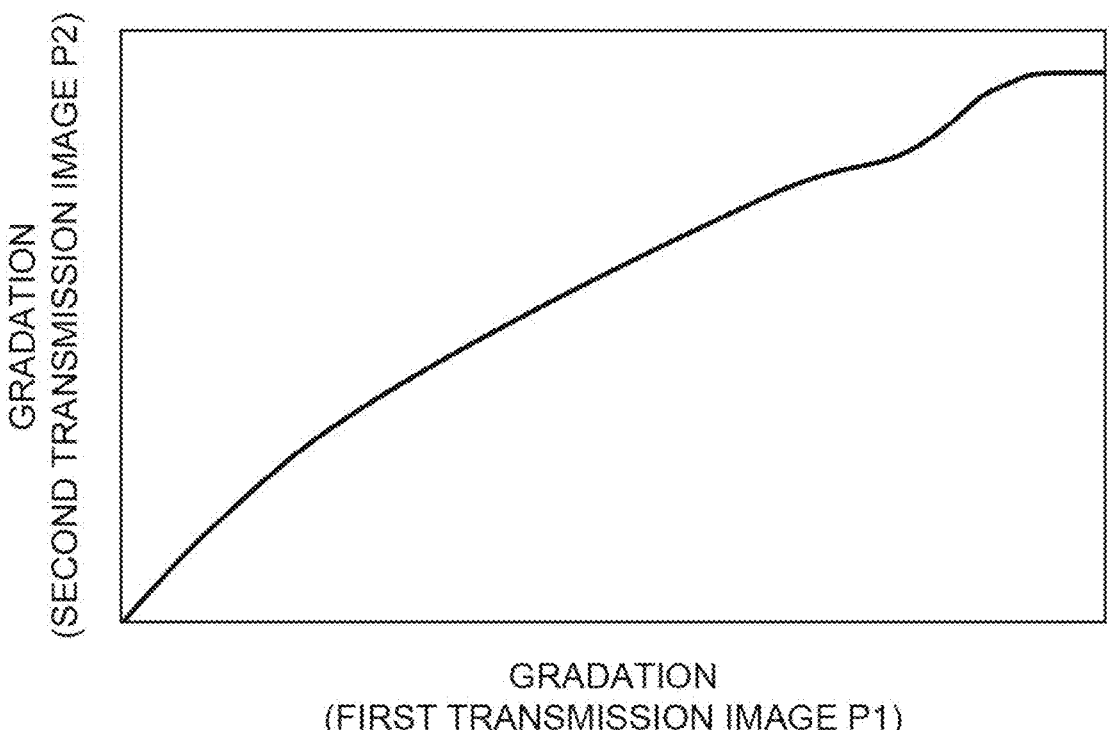
FIG. 7 is a graph showing an LUT that is generated on the basis of first data and second data.

The control unit 10 performs a process (LUT generation process) of generating an LUT used to match the brightness of the first transmission image P1 with the brightness of the second transmission image P2 on the basis of the first data and the second data. In this embodiment, an LUT indicating the gradation of the first transmission image P1 and the gradation of the second transmission image P2 corresponding to a predetermined number of stacked pixels is generated. FIG. 7 is a graph showing an LUT that is generated on the basis of the first data and the second data. In FIG. 7, the horizontal axis indicates the gradation of the first transmission image P1, and the vertical axis indicates the gradation of the second transmission image P2. FIG. 7 shows that the gradation of the first transmission image P1 increases toward the right side of paper and the gradation of the second transmission image P2 increases toward the upper side of the paper (this holds for FIGS. 8A and 8B which will be described below).

Figure 8A:
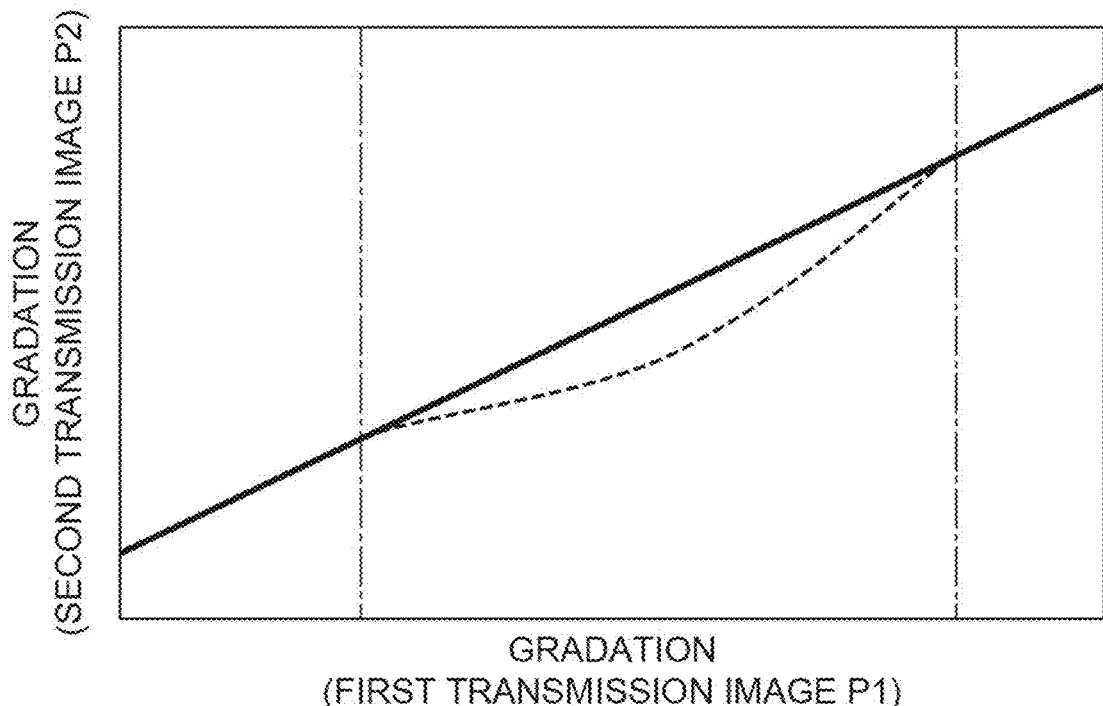
FIG. 8A is an enlarged view showing a main portion for describing an LUT correction process.
Figure 8B:
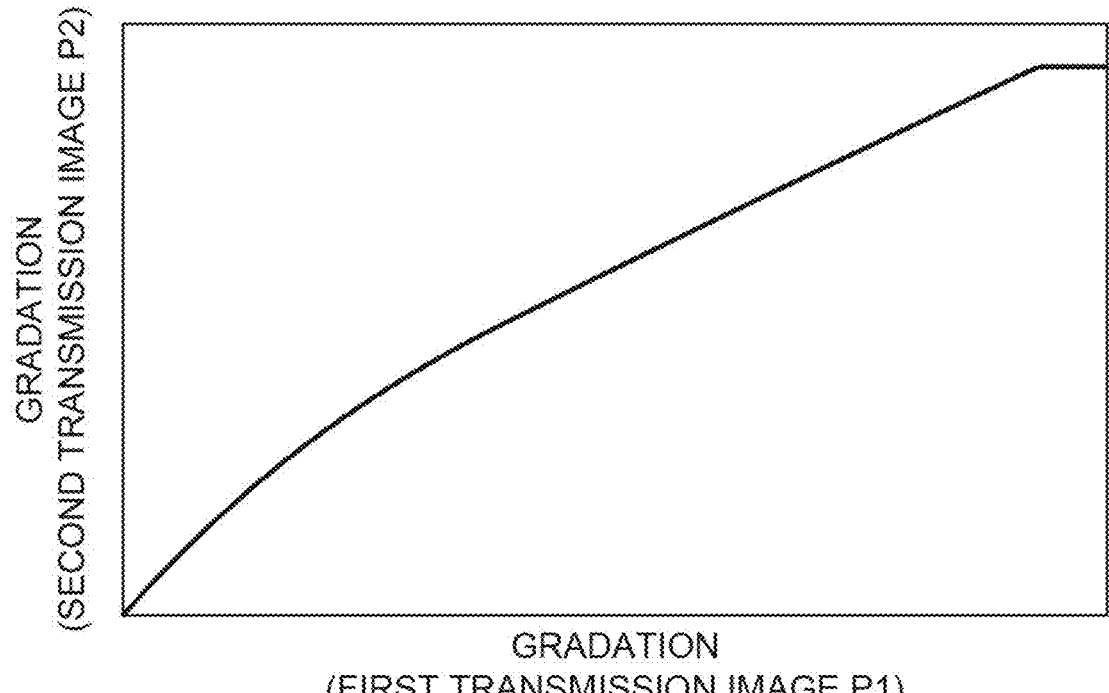
FIG. 8B is a graph showing the corrected LUT.

The control unit 10 performs a process (LUT correction process) of correcting at least a part of the LUT, directly or indirectly using the luminance distribution of the background image. In this embodiment, the control unit 10 corrects the first gradation T1 to the second gradation T2 obtained from the luminance distribution of the background image in the LUT. For example, the control unit 10 performs the correction of adding a predetermined value to the integrated number of pixels of the first data in at least a part of from the first gradation T1 to the second gradation T2. The predetermined value may be a constant or a variable. In the latter case, the predetermined value may increase proportionally (linearly), polynomially, logarithmically, exponentially, or stepwise as the gradation increases. In this embodiment, the control unit 10 corrects the first gradation T1 to the second gradation T2 in the LUT so as to increase proportionally. In this case, the LUT from the first gradation T1 to the second gradation T2 is corrected like a histogram shown in FIG. 8A. Specifically, as shown in FIG. 8A, the LUT is corrected such that the histogram changes from the first gradation T1 to the second gradation T2 along a line segment connecting the first gradation T1 and the second gradation T2 (that is, changes linearly). Therefore, the control unit 10 generates a R_LUT which corresponds to the corrected LUT as shown in FIG. 8B. Similarly to the first gradation T1 and the second gradation T2, the R_LUT is stored in the storage unit in association with, for example, the transport speed of the transport unit 5, the detection level of the X-ray detection unit 7, and the like. Therefore, for example, the R_LUT may differ for each transport speed of the transport unit 5. In addition, the direct use of the luminance distribution means that information obtained from the luminance distribution (for example, the first gradation T1 and the second gradation T2) is used without any change. Further, the indirect use of the luminance distribution means that data obtained by processing the information obtained from the luminance distribution is used.

Figure 9:
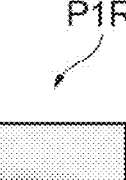
FIG. 9 is a diagram showing a corrected first transmission image.
Figure 9:
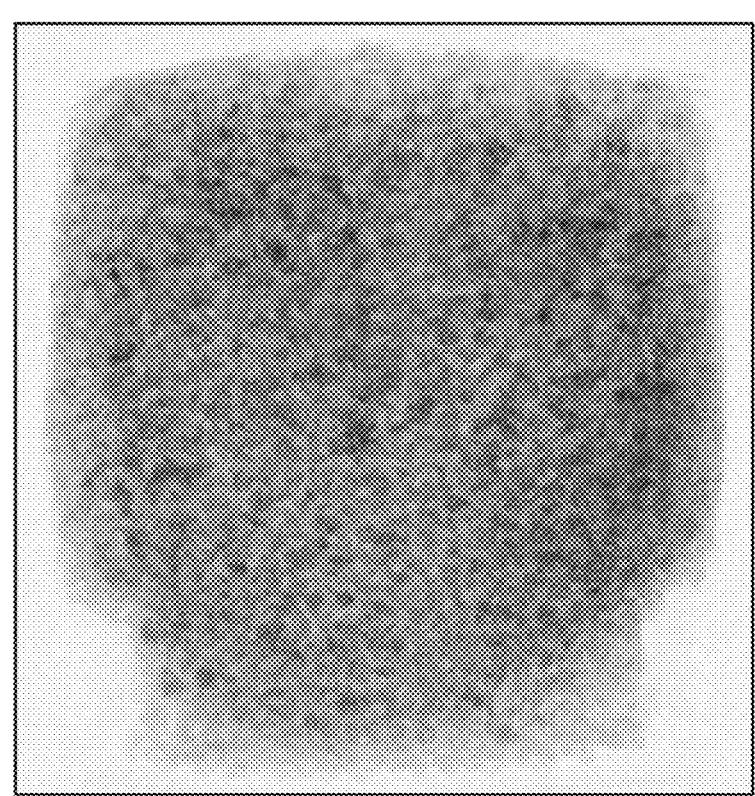

The control unit 10 performs a process (image correction process) of correcting the brightness of the first transmission image P1 using the R_LUT. In the image correction process, not only the correction of the brightness of the first transmission image P1 but also, for example, resizing may be performed. As shown in FIG. 9, a corrected first transmission image P1R (a first transmission image after the image correction process) whose brightness, size, and the like have been matched with those of the second transmission image P2 is generated by performing the image correction process.

The control unit 10 performs a subtraction process on the corrected first transmission image P1R and the second transmission image P2. The corrected first transmission image P1R is divided by the luminance value of the second transmission image P2 for each pixel by the subtraction process. Therefore, the control unit 10 generates a difference image P3 obtained by extracting the difference between the corrected first transmission image P1R and the second transmission image P2.

Figure 10:
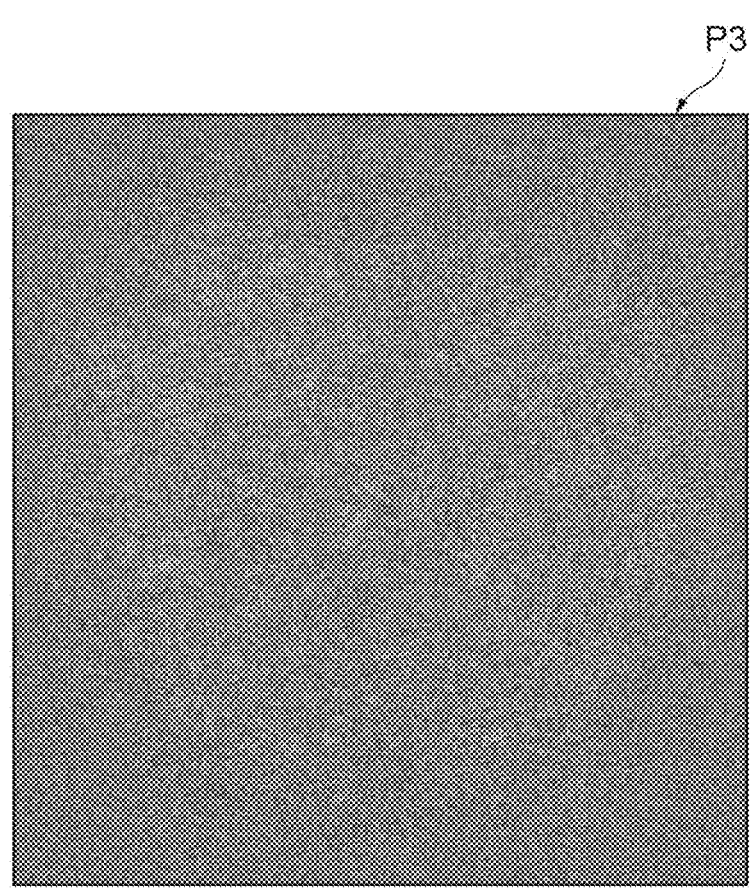
FIG. 10 is a diagram showing a difference image.

The control unit 10 determines whether or not a foreign material is included in the article G on the basis of the difference image P3 obtained by the subtraction process. For example, the control unit 10 performs a process (energy analysis process) of determining whether or not the gradation is greater than a predetermined threshold value in the difference image P3 shown in FIG. 10. In a case in which it is determined that the difference image P3 has a gradation greater than the predetermined threshold value, the control unit 10 determines that the article G includes a foreign material. In this embodiment, the control unit 10 determines that the article G does not include any foreign material. The control unit 10 stores a determination result in the storage unit. The threshold value may be appropriately set by, for example, a test according to the properties of the article G. As a specific example, the threshold value can be set using a sample having a foreign material mixed therewith.

Among the above-described processes included in an example of the image processing, some processes and other processes are performed at different timings. In this embodiment, the process of analyzing the luminance distribution of the background image and the process of acquiring the noise information are performed, for example, during the pre-inspection process of the X-ray inspection apparatus 1. Further, the process of analyzing the shading information of each image, the LUT generation process, and the LUT correction process are performed during the setting of the inspection conditions for the article G in the X-ray inspection apparatus 1. In addition, the image correction process and the subtraction process are performed during the inspection of the article G by the X-ray inspection apparatus 1. In this case, in the inspection of the article G by the X-ray inspection apparatus 1, the R_LUT stored in advance in the storage unit before the inspection is used. This makes it possible to reduce the calculation load of the X-ray inspection apparatus 1 during the inspection of the article G.

Next, an example of an LUT generation method performed by the X-ray inspection apparatus 1 according to this embodiment and an example of an X-ray inspection method using the LUT will be described below.

First, before the X-ray inspection of the article G by the X-ray inspection apparatus 1 is performed (for example, at the time of the pre-inspection process of the X-ray inspection apparatus 1, or the like), the luminance distribution of the background image is analyzed (Step S0). In Step S0, the background image is generated on the basis of the detection results of the first line sensor 11 and the second line sensor 12 during the idle operation of the X-ray inspection apparatus 1. Then, the gradation (luminance value) of each pixel in the background image is determined, and then the number of pixels for each gradation is calculated. In this way, the luminance distribution of the background image is analyzed. Then, the first gradation T1 and the second gradation T2 are specified from the analyzed luminance distribution.

Then, the article G that is being transported is irradiated with X-rays in the first energy band and X-rays in the second energy band (Step S1: an electromagnetic wave irradiation step). In Step S1, while the inspection conditions for the article G in the X-ray inspection apparatus 1 are being set, the article G transported into the shield box 4 by the transport unit 5 is irradiated with the X-rays. Then, the X-ray detection unit 7 detects the X-rays.

Then, the first transmission image P1 is generated on the basis of the detection result of the X-rays in the first energy band, and the second transmission image P2 is generated on the basis of the detection result of the X-rays in the second energy band (Step S2: an image generation step). In Step S2, the detection results of the X-ray detection unit 7 are input to the control unit 10 to generate the first transmission image P1 and the second transmission image P2.

Then, the image processing including the subtraction process is performed on the first transmission image P1 and the second transmission image P2 by using the luminance distribution related to the background other than the article G displayed in the first transmission image P1 and the second transmission in P2 (Step S3: an image processing step). In Step S3. first, the shading information of each of the first transmission image P1 and the second transmission image P2 is analyzed. Therefore, the first data indicating the number of pixels for each gradation in the first transmission image P1 and the second data indicating the number of pixels for each gradation in the second transmission image P2 are generated. Then, an LUT that is used to match the brightness of the first transmission image P1 with the brightness of the second transmission image P2 is generated on the basis of the first data and the second data. Then, at least a part of the LUT is corrected using the luminance distribution of the background image. Therefore, an R_LUT which is the corrected LUT is generated. The R_LUT is generated in the middle of Step S3 described above.

Then, the brightness of the first transmission image P1 obtained by the X-ray inspection of the article G by the X-ray inspection apparatus 1 is corrected using the R_LUT. Therefore, the corrected first transmission image P1R (the first transmission image after the image correction process) whose luminance, size, and the like have been matched with those of the second transmission image P2 obtained by the X-ray inspection is generated. Then, the subtraction process is performed on the corrected first transmission image P1R and the second transmission image P2. Therefore, the difference image P3 obtained by extracting the difference between the corrected first transmission image P1R and the second transmission image P2 is generated.

Then, it is determined whether a foreign material is included in the article G on the basis of the difference image P3 obtained after Step S3 (Step S4: a foreign material determination step). Then, the determination result of Step S4 is stored in the storage unit.

Figure 11:
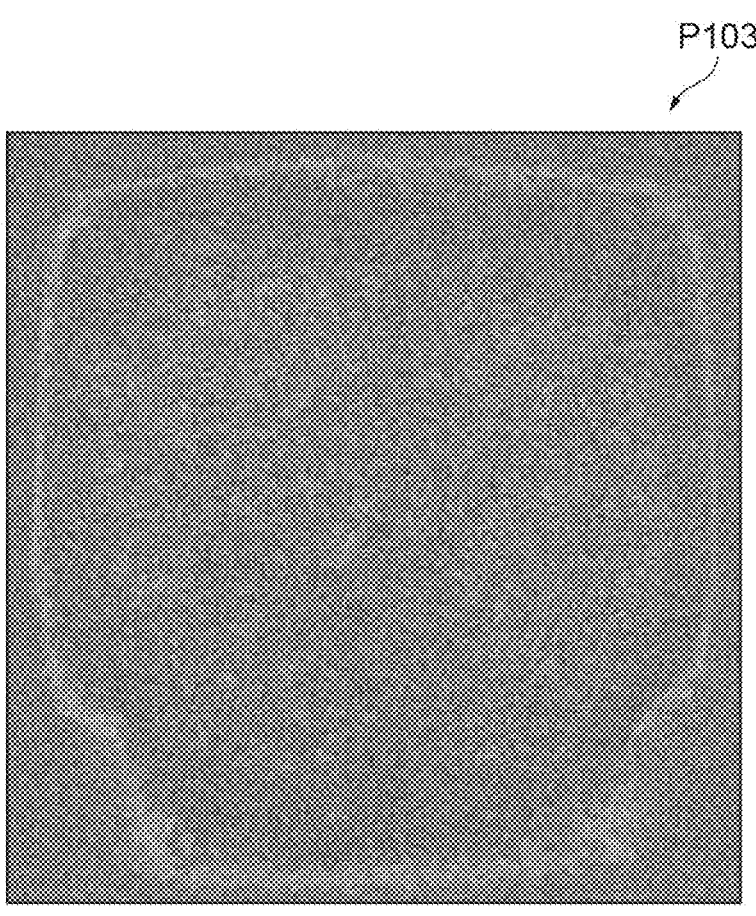
FIG. 11 is a diagram showing a difference image according to a comparative example.

The operation and effect of the X-ray inspection apparatus 1 and the X-ray inspection method using the X-ray inspection apparatus 1 according to the above-described embodiment will be described with reference to a comparative example described below. The configuration of an X-ray inspection apparatus according to the comparative example is the same as that of the X-ray inspection apparatus 1 according to this embodiment, and a first transmission image P1 and a second transmission image P2 of the article G are generated. In addition, as in this embodiment, histograms H1 to H4 and an LUT are also generated. On the other hand, in the comparative example, the brightness of the first transmission image P1 generated during the X-ray inspection is corrected using the LUT without any correction. Then, the subtraction process is performed on the corrected first transmission image and the second transmission image P2 to obtain a difference image. FIG. 11 is a diagram showing the difference image according to the comparative example. As shown in FIG. 11, in a difference image P103 according to the comparative example, the contour of the article G and the vicinity thereof have a higher gradation than other portions (that is, brighter). Here, in a case in which the contour of the article G and at least a part of the vicinity thereof have a gradation greater than a predetermined threshold value, the X-ray inspection apparatus according to the comparative example erroneously determines that the article includes a foreign material. This erroneous determination is likely to occur more frequently as the transport speed of the article by the transport unit 5 becomes higher. Specific examples of the cause of the above-described erroneous determination include a short X-ray irradiation time for the article G and the inclusion of a large amount of noise in data output from the X-ray detection unit 7.

Figure 12A:
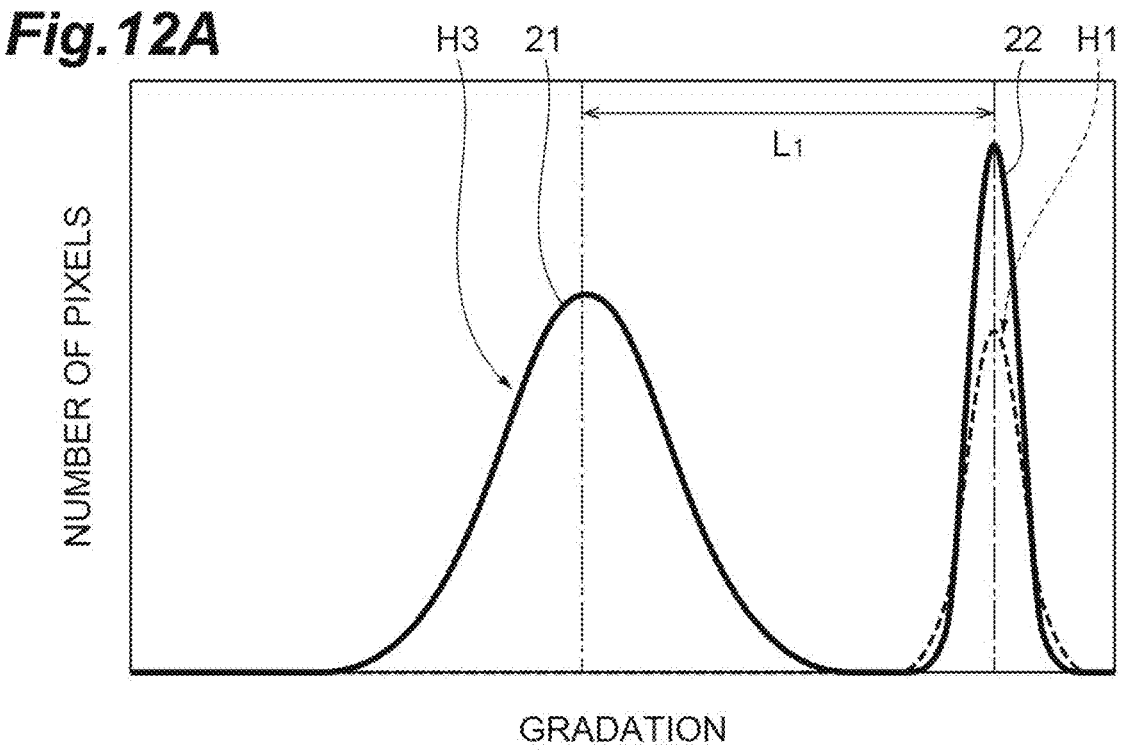
FIG. 12A is a diagram including a histogram showing the number of pixels for gradation in a background image obtained by irradiation with X-rays in a first energy band and the histogram shown in FIG. 5A.
Figure 12B:
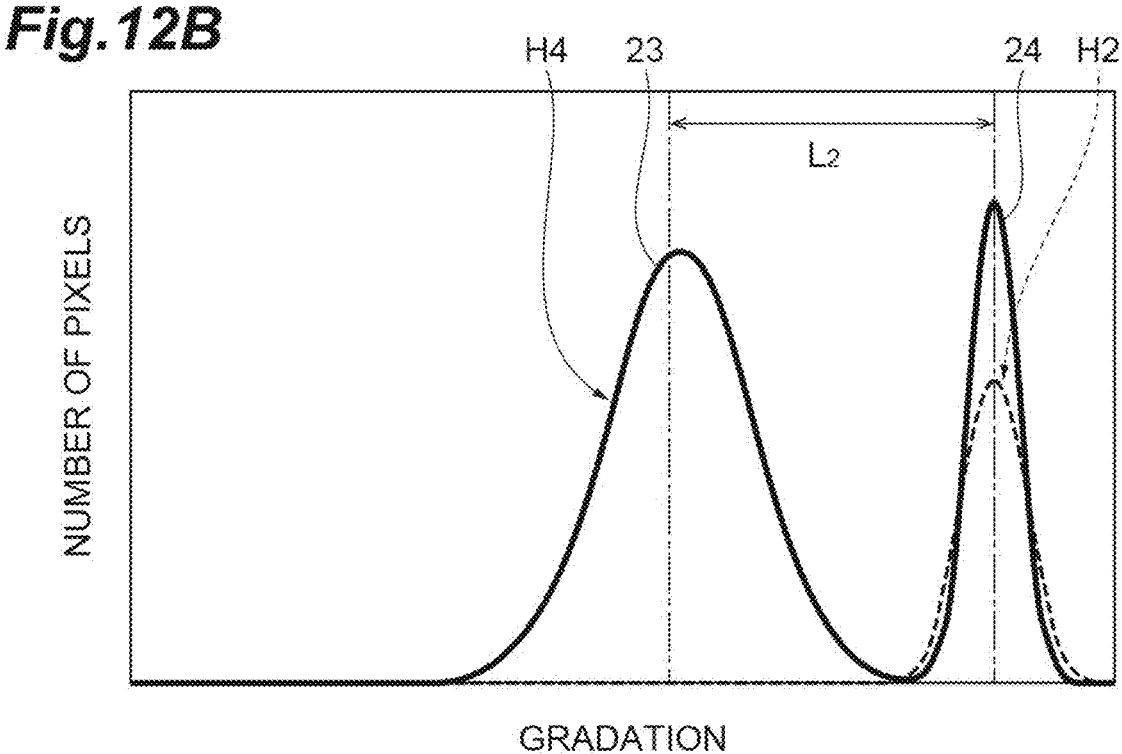
FIG. 12B is a diagram including a histogram showing the number of pixels for gradation in a background image obtained by irradiation with X-rays in a second energy band and the histogram shown in FIG. 6A.

The reason why the difference image P103 was generated in the comparative example was examined, and the differences between the positions of two peaks in a histogram obtained from the first transmission image and the positions of two peaks in a histogram obtained from the second transmission image were found as shown in FIGS. 12A and 12B. FIG. 12A is a diagram including the histogram showing the number of pixels for gradation in the background image obtained by irradiation with X-rays in the first energy band and the histogram shown in FIG. 5A. FIG. 12B is a diagram including the histogram showing the number of pixels for gradation in the background image obtained by irradiation with X-rays in the second energy hand and the histogram shown in FIG. 6A.

The comparison between a histogram H3 shown in FIG. 12A and a histogram H4 shown in FIG. 12B shows that a distance $L_2$ (gradation difference) between peaks 23 and 24 is shorter than a distance $L_1$ (gradation difference) between peaks 21 and 22. Therefore, in the second transmission image P2, it is difficult to determine the boundary between the article G which is an inspection object and the surface of the transport unit 5 which is the background. In addition, in some cases, a predetermined pixel that is determined to be the edge of the inspection object in the first transmission image P1 is determined to be the background in the second transmission image P2, due to the deviation between the positions of the peaks. For these reasons, the reliability of the LUT is low at the boundary between the inspection object and the background and in a region (boundary region) brighter than the boundary. Therefore, in a case in which the brightness of the first transmission image P1 is corrected by using the LUT not corrected at all as in the comparative example, the correction in the boundary region is insufficient. In this case, a pixel with an inappropriate gradation may occur in the boundary region after the subtraction process.

In contrast, in the X-ray inspection apparatus 1 according to this embodiment, the control unit 10 performs the image processing including the subtraction process on the first transmission image P1 and the second transmission image P2 by using the luminance distribution related to the background other than the article G displayed in the first transmission image P1 and the second transmission image P2. In the difference image P3 obtained by performing the image processing using the luminance distribution, a pixel with an inappropriate gradation is less likely to occur, for example, at the boundary between the article G and the background. It is possible to perform a high-accuracy energy analysis process since such an energy analysis process is performed using the difference image P3. This makes it possible to prevent a reduction in the inspection accuracy of the article G, for example, even when the transport speed of the article G by the transport unit 5 is increased.

In this embodiment, the image processing includes the LUT generation process of generating the LUT used to match the brightness of the first transmission image P1 with the brightness of the second transmission image P2 on the basis of the first data indicating the number of pixels for each gradation in the first transmission image P1 and the second data indicating the number of pixels for each gradation in the second transmission image P2, the LUT correction process of correcting at least a portion of the LUT using the luminance distribution, and the image correction process of correcting the brightness of the first transmission image P1 using the corrected LUT, and the subtraction processing is performed on the corrected first transmission image P1R and the second transmission image P2. Therefore, the first transmission image P1 is corrected with the LUT corrected using the luminance distribution. As a result, a preferable difference image P3 can be generated.

In this embodiment, the control unit 10 specifies the first gradation T1 corresponding to the largest number of pixels from the luminance distribution of the background, and the second gradation T2 which is lower than the first gradation T1 and is closest to the first gradation T1 among the gradations corresponding to the smallest number of pixels from the luminance distribution, and corrects at least a part of the LUT from the first gradation T1 to the second gradation T2. This makes it easy to generate an appropriate difference image P3.

In this embodiment, the control unit 10 may correct the first gradation T1 to the second gradation T2 in the LUT so as to increase proportionally. In this case, it is possible to easily and satisfactorily correct the LUT.

The embodiment of the present disclosure has been described above. However, the present disclosure is not necessarily limited to the above-described embodiment, and various modifications can be made without departing from the scope of the present disclosure.

In the above-described embodiment, the control unit different from the X-ray detection unit generates, for example, the first transmission image and the second transmission image on the basis of the detection results of the X-ray detection unit. However, the present disclosure is not limited thereto. For example, the X-ray detection unit may generate, for example, the first transmission image and the second transmission image on the basis of the detection results and output the images to the control unit. In a case in which the X-ray detection unit includes a field-programmable gate array (FPGA) and the like, the FPGA and the like may be regarded as a part of the control unit.

In the above-described embodiment, the X-ray detection unit is configured to detect X-rays in two bands, however, the present disclosure is not limited thereto. In other words, the X-ray inspection apparatus uses X-rays in two bands, however, the present disclosure is not limited thereto. For example, the X-ray detection unit may be configured to detect X-rays in three or more bands. In this case, the X-ray inspection apparatus may determine whether or not a foreign material is included in the article, using X-rays in three or more bands.

In the above-described. embodiment, the X-ray detection unit has the first line sensor and the second line sensor, however, the present disclosure is not limited thereto. For example, the X-ray detection unit may be capable of detecting X-rays in a specific energy band, may be a direct-conversion-type detection unit that can detect X-rays in a photon counting manner, or may be an indirect-conversion-type detection unit. In a case in which the X-ray detection unit is a direct-conversion-type detection unit, the X-ray detection unit includes, for example, a sensor (multi-energy sensor) that detects X-rays in each of energy bands that are transmitted through the article. The sensor includes elements that are arranged, for example, in a direction (width direction) orthogonal to the transport direction and the vertical direction. The elements may be arranged not only in the width direction but also in the transport direction. That is, the X-ray detection unit may be a single line sensor or may include a group of sensors that are arranged two-dimensionally. The sensor is, for example, a photon-detection-type sensor such as a CdTe semiconductor detector. In the sensor included in the X-ray detection unit, for example, electron-hole pairs are generated by the arrival of X-ray photons. Photon counting is performed on the basis of energy obtained at this time. Here, photon counting in each energy band can be performed using a predetermined threshold value (one or more threshold values). In other words, the use of the predetermined threshold value makes it possible for the single sensor to detect X-rays in the first energy band and X-rays in the second energy band. The X-ray detection unit outputs a signal (detection result signal) corresponding to the detection results of the X-rays to the control unit.

In the above-described embodiment, as the image processing using the luminance distribution, the first gradation and the second gradation are obtained from the luminance distribution of the background image, and the LUT is corrected by using the first and second gradations. That is, in the above-described embodiment, the luminance distribution of the background image is directly used to correct the LUT. However, the present disclosure is not limited thereto. The control unit may indirectly use the luminance distribution of the background image to correct the LUT. For example, the control unit may generate an LUT for correction on the basis of the luminance distribution of the background image obtained by irradiation with X-rays in the first energy band and the background image obtained by irradiation with X-rays in the second energy band. That is, the control unit may generate the LUT for correction processed from information obtained from the luminance distribution. In this case, the control unit may correct at least a part of the LUT generated on the basis of the first data indicating the number of pixels for each gradation in the first transmission image and the second data indicating the number of pixels for each gradation in the second transmission image by using the LUT for correction which is generated on the basis of the luminance distribution. In other words, the control unit may indirectly use the luminance distribution (use the LUT for correction) to correct at least a part of the LUT generated on the basis of the first data and the second data.

In the above-described embodiment, the X-ray inspection apparatus includes the control unit that performs the image processing, however, the present disclosure is not limited thereto. For example, the function of performing the image processing, the function of determining whether or not a foreign material is included in the article on the basis of the difference image, the function of displaying the X-ray inspection results, and the like in the control unit may not be included in the X-ray inspection apparatus. Alternatively, the functions may be provided in a controller that can perform wired communication or wireless communication with the X-ray inspection apparatus. In this case, it is possible to implement an X-ray inspection system including the X-ray inspection apparatus and the controller to which the inspection results of the X-ray inspection device are input. The same operation and effect as those of the above-described embodiment are also obtained by this X-ray inspection system. In addition, it is possible to simplify the configuration of the control unit provided in the X-ray inspection apparatus. Furthermore, the user can check, for example, the difference image even at a place away from the X-ray inspection apparatus. The controller may not have the function of determining whether or not a foreign material is included. For example, the controller may have at least the function of generating the LUT and the R_LUT.

What is claimed is:

1. An X-ray inspection apparatus comprising:
a transport unit configured to transport an article;

an electromagnetic wave irradiation unit configured to irradiate the article with a first electromagnetic wave in a first energy band and a second electromagnetic wave in a second energy band higher than the first energy band;
an electromagnetic wave sensor configured to detect the first electromagnetic wave and the second electromagnetic wave emitted to the article; and
a control unit to which a detection result of the electromagnetic wave sensor is input,
wherein the control unit is configured to:
generate a first transmission image based on a detection result of the first electromagnetic wave and a second transmission image based on a detection result of the second electromagnetic wave;
perform, after specifying a gradation corresponding to a largest number of pixels from a luminance distribution related to a background other than the article displayed in the first transmission image and the second transmission image, image processing including a subtraction process on the first transmission image and the second transmission image based on the gradation that has been specified; and
determine whether or not a foreign material is included in the article on the basis of a difference image obtained by the subtraction process.

2. The X-ray inspection apparatus according to claim 1, wherein the image processing further includes:
a look-up table (LUT) generation process of generating an LUT used to match a brightness of the first transmission image with a brightness of the second transmission image, on the basis of first data indicating the number of pixels for each gradation in the first transmission image and second data indicating the number of pixels for each gradation in the second transmission image;
an LUT correction process of correcting at least a portion of the LUT, directly or indirectly using the luminance distribution; and
an image correction process of correcting the brightness of the first transmission image using the corrected LUT, and
wherein the subtraction process is performed on the first transmission image after the image correction process and the second transmission image.

3. The X-ray inspection apparatus according to claim 2, wherein the control unit is configured to:
specify a second gradation which is lower than the gradation and is closest to the gradation among gradations corresponding to a smallest number of pixels from the luminance distribution in addition to the gradation; and
correct at least a part of the LUT from the gradation to the second gradation.

4. The X-ray inspection apparatus according to claim 3, wherein the control unit is configured to correct between the gradation and the second gradation in the LUT so as to increase proportionally.

5. The X-ray inspection apparatus according to claim 2, wherein, in the LUT correction process, at least a part of the LUT is corrected using an LUT for correction which is generated on the basis of the luminance distribution.

6. The X-ray inspection apparatus according to claim 1, wherein the electromagnetic wave sensor includes a sensor member configured to detect X-rays in a plurality of different energy bands.

7. The X-ray inspection apparatus according to claim 1, wherein the background is a portion of a surface of the transport unit.

8. The X-ray inspection apparatus according to claim 7, wherein the luminance distribution related to the background is generated during an idle operation of the X-ray inspection apparatus in which no articles are disposed on the transport unit.

9. An X-ray inspection system comprising:
an X-ray inspection apparatus including:
   a transport unit configured to transport an article;
   an electromagnetic wave irradiation unit configured to irradiate the article with a first electromagnetic wave in a first energy band and a second electromagnetic wave in a second energy band higher than the first energy band; and
   an electromagnetic wave sensor configured to detect the first electromagnetic wave and the second electromagnetic wave emitted to the article; and
a controller to which a detection result of the X-ray inspection apparatus is input,
wherein the controller is configured to:
   generate a first transmission image based on a detection result of the first electromagnetic wave and a second transmission image based on a detection result of the second electromagnetic wave; and
   perform, after specifying a gradation corresponding to a largest number of pixels from a luminance distribution related to a background other than the article displayed in the first transmission image and the second transmission image, image processing including a subtraction process on the first transmission image and the second transmission image based on the gradation that has been specified.

10. The X-ray inspection system according to claim 9, wherein the image processing further includes:
   a look-up table (LUT) generation process of generating an LUT used to match a brightness of the first transmission image with a brightness of the second transmission image, on the basis of first data indicating the number of pixels for each gradation in the first transmission image and second data indicating the number of pixels for each gradation in the second transmission image;
   an LUT correction process of correcting at least a portion of the LUT, directly or indirectly using the luminance distribution; and
   an image correction process of correcting the brightness of the first transmission image using the corrected LUT, and
wherein the subtraction process is performed on the first transmission image after the image correction process and the second transmission image.

11. The X-ray inspection system according to claim 10, wherein the controller is configured to:
   specify a second gradation which is lower than the gradation and is closest to the gradation among gradations corresponding to a smallest number of pixels from the luminance distribution in addition to the gradation; and
   correct at least a part of the LUT from the gradation to the second gradation.

12. The X-ray inspection system according to claim 11, wherein the controller is configured to correct between the gradation and the second gradation in the LUT so as to increase proportionally.

13. The X-ray inspection system according to claim 10, wherein, in the LUT correction process, at least a part of the LUT is corrected using an LUT for correction which is generated on the basis of the luminance distribution.

14. The X-ray inspection system according to claim 9, wherein the electromagnetic wave sensor includes a sensor member configured to detect X-rays in a plurality of different energy bands.

15. The X-ray inspection system according to claim 9, wherein the background is a portion of a surface of the transport unit.

16. The X-ray inspection system according to claim 15, wherein the luminance distribution related to the background is generated during an idle operation of the X-ray inspection apparatus in which no articles are disposed on the transport unit.

17. An X-ray inspection method comprising:
irradiating an article which is being transported, with a first electromagnetic wave in a first energy band and a second electromagnetic wave in a second energy band higher than the first energy band;
generating a first transmission image based on a detection result of the first electromagnetic wave and generating a second transmission image based on a detection result of the second electromagnetic wave;
performing, after specifying a gradation corresponding to a largest number of pixels from a luminance distribution related to a background other than the article displayed in the first transmission image and the second transmission image, image processing including a subtraction process on the first transmission image and the second transmission image based on the gradation that has been specified; and
determining whether or not a foreign material is included in the article on the basis of a difference image obtained after the performing the image processing.

18. The X-ray inspection method according to claim 17, wherein the background is a portion of a surface of a transport unit on which the article is transported.

19. The X-ray inspection method according to claim 18, further comprising
   generating the luminance distribution related to the background during an idle operation in which no articles are disposed on the transport unit.

\* \* \* \* \*